3,398,012
CONTINUOUS PROCESS FOR THE COATING OF
PARTICULATE MATERIAL WITH RESIN
Eric Parkes, Solihull, and Anthony Walter Lawrence, Woodsetton, near Dudley, England, assignors to Fordath Engineering Company Limited, West Bromwich, England, a British company
Filed Sept. 8, 1964, Ser. No. 394,775
3 Claims. (Cl. 117—100)

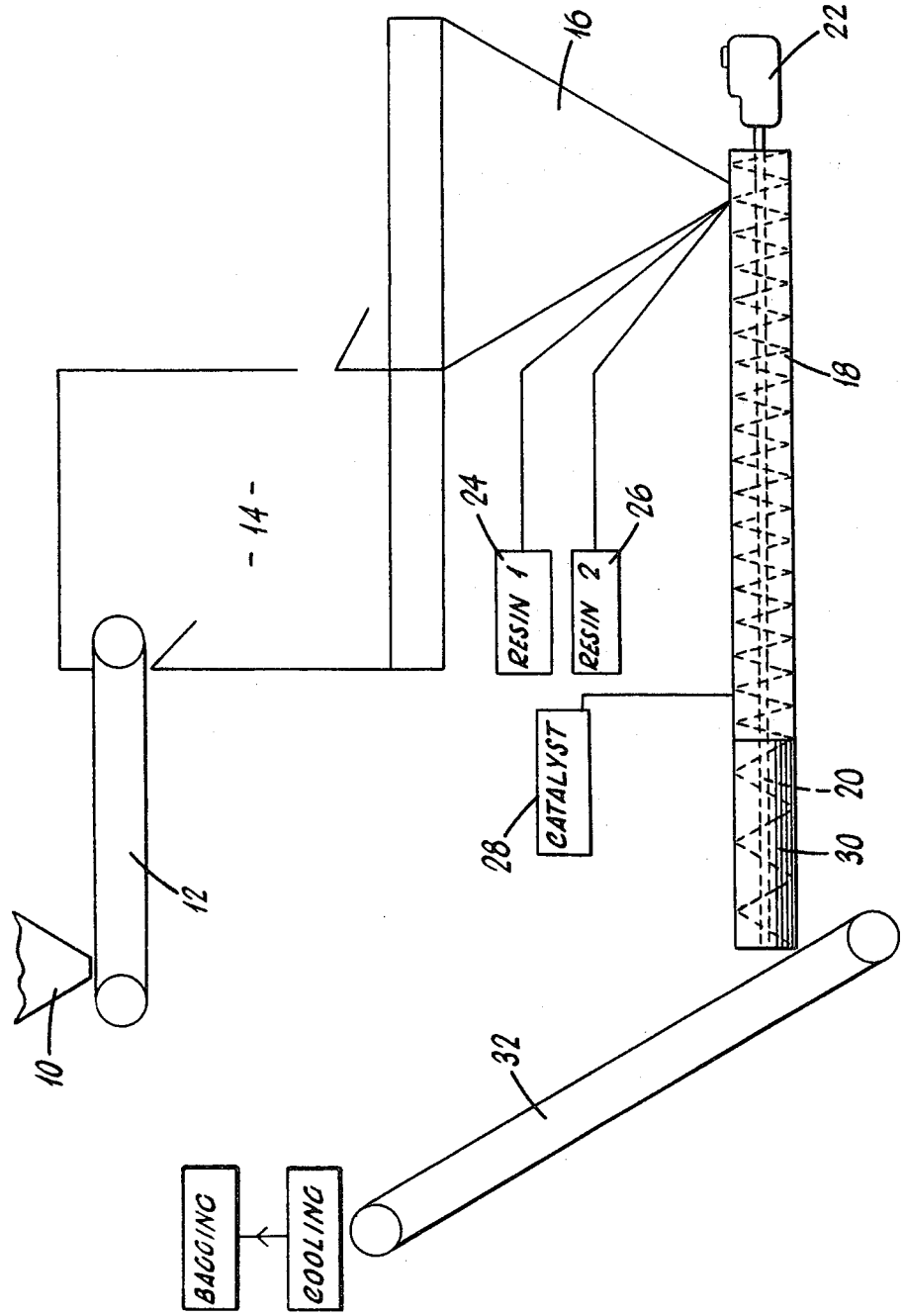

ABSTRACT OF THE DISCLOSURE

A process for preparing resin-coated sand in which heated sand is fed into a mixer and conveyor unit to which resin is also fed, a curing agent for the resin being subsequently added with continuous mixing and conveying and cooling of the resin coated sand then being effected.

---

This invention relates to a new or improved process for the continuous coating of particulate material with resin and is especially applicable to the production of resin coated sand for use in the foundry industry.

Resin coated sand is used, for example, in the shell moulding process. During the coating of the sand the resin is heated or taken to a predetermined melt point, a catalyst or curing agent such as hexamethylenetetramine is mixed with the resin and sand so that the catalyst forms part of the coating. When the sand comes into contact with a heated pattern plate, as is the case in the shell moulding process, very rapid polymerization takes place.

Heretofore such resin coated sand has been produced upon a batch basis in a conventional rotary type mixer, resin and sand being introduced into the mixer in quantities depending upon the capacities thereof, mixing continued for a predetermined time in the presence of a stream of heated air in order to take the resin to the desired melt point, and to evaporate the solvent in which the resin is dissolved, the catalyst or curing agent is then added and mixing continued for a further predetermined time. At the end of the mixing cycle the coated sand, which, at this stage, is hot and of a lumpy consistency, is discharged from the mixer, broken down by a vibratory screen and then cycloned in order to provide a storage stable, free flowing coated sand which can be used immediately or can be bagged ready for future use.

In a typical installation for carrying out such a process, the production capacity is of the order of one and a half to two and a half tons per hour, the mixer being of half-ton batch capacity and requiring a seventy-five horsepower electric motor to drive the paddle thereof.

The object of the present invention is to provide an improved process for the production of resin coated particulate material which, when applied to resin coated sand, will result in considerably increased production capacity and substantial economies in the operation of the coating process.

One example of our invention will now be described with reference to the single figure of the accompanying drawing which illustrates schematically one form of apparatus for carrying out the process which is the subject of this invention.

Sand is fed into a hopper 10 and from the hopper it is fed by means of an endless belt conveyor 12 into a fluidizing bed 14 which is provided with heating means. The sand is heated to an accurately predetermined temperature within the range of from 130° to 200° centigrade in the fluidizing bed 14 and then passes into a feed hopper 16 which is disposed above and adjacent one end of a worm-type conveyor 18 which includes a central shaft 20 driven by an electric motor 22. The feed hopper 16 includes metering means for accurately controlling the rate of feed of sand to the conveyor.

Resin for coating the sand is fed into the conveyor 18 adjacent the sand feed-point and it has been found advantageous to add a solid resin and a liquid resin simultaneously. The solid resin is added in powder form from a container 24 and the liquid resin is pumped from a tank 26. One form of solid resin which has been found suitable is a phenol-formaldehyde resin with a molar ratio of phenol to formaldehyde of approximately 1 to 0.8 with up to 5% by weight of Acrawax "C" added as a lubricant (Acrawax "C" is a trade name for ethylene bis stearamide).

A suitable liquid resin is an aqueous solution of a phenol-formaldehyde resin with a molar ratio of phenol to formaldehyde of approximately 1 to 0.6 with a total solids content of the order of 75% by weight.

The sand is coated with the resins as the sand and resins are conveyed along the trough of the conveyor 18 and the mixing blades on the shaft 20 are so designed as to give extremely thorough mixing and efficient coating of the sand with the resin. Approximately two-thirds of the way along the conveyor 18 a curing agent or catalyst for the resin is fed in a continuous stream from a storage tank 28. The curing agent is conveniently hexamethylenetetramine. Just after the feed point for the curing agent a water cooling jacket 30 is fixed around the trough of the conveyor 18 and the helical pitch of the mixing blades is increased so that the resin-coated sand and curing agent are relatively rapidly transferred to a discharge position from whence the resin-coated sand may be carried by an endless belt conveyor 32 to a cooling station and thence to a bagging or discharge station.

Typical figures for such a process are as follows; sand at a temperature of 150° centigrade is fed from the feed hopper 16 to the conveyor 18 at a rate of 7 tons per hour. The solid and liquid resins are added at a controlled combined rate of 700 pounds per hour. The catalyst is added just before the position at which the cooling jacket effects a rapid lowering in the temperature of the mixed resin and sand so as to prevent premature polymerisation of the resins. A typical sample had a transverse strength after 90 seconds cure at 270° centigrade of 150 pounds per square inch.

In a second example the rate of feed of sand was as above and in this case powdered resin was added at the rate of 275 pounds per hour and liquid resin at a rate of 195 pounds per hour. 135 pounds of a 45% aqueous solution of hexamethylenetetramine was added per hour as a catalyst.

A typical sample prepared at an investing rate of 130 grams in 15 seconds at 238° centigrade had a melt point of 97° centigrade, a loss on ignition of 3.9% and a transverse strength of 130 pounds per square inch.

Instead of employing a solid and a liquid resin either may be replaced by a molten resin which would be stored in a heated vessel at a temperature within the range of from 120 to 150° centigrade and dispensed by means of a metering pump.

What we claim then is:
1. A process for the preparation of resin-coated particulate material for use in the foundry art which comprises the steps of:
   (a) feeding particulate material in a continuous stream at a predetermined rate and at an elevated temperature within a range of from about 130° C. to about 200° C., to one end of a combined mixer and conveyor unit,
   (b) feeding resin in a continuous stream and at a predetermined rate to said one end of the unit,
   (c) mixing and simultaneously conveying the particulate material and the resin for a predetermined time so as to coat the particulate material with the resin, (d) adding a curing agent for the resin in a substantially continuous stream, (e) mixing and conveying the particulate material, resin and curing agent and simultaneously cooling said resin-coated particulate material and curing agent, and (f) discharging a continuous stream of storage stable, free-flowing resin-coated particulate material from the combined mixer and conveyor unit.

2. A process for the preparation of resin-coated sand which comprises the steps of:

(a) feeding sand heated to a temperature within the range of from 130° to 200° centigrade to one end of a combined mixer and conveyor unit, (b) adding a liquid resin in a continuous stream and at a predetermined rate to said combined mixer and conveyor unit, (c) adding a solid resin in a continuous stream and at a predetermined rate to said combined mixer and conveyor unit, (d) mixing and simultaneously conveying the sand and resins for a predetermined time so as to coat the sand with the resins, (e) adding a curing agent for the resins in a substantially continuous stream, (f) mixing and conveying the resin-coated sand and curing agent and simultaneously cooling said resin-coated sand and curing agent, and (g) discharging the coated sand from the unit as a continuous stream.

3. A process for the preparation of resin-coated sand which comprises the steps of:

(a) feeding sand heated to a temperature within the range of from 130° to 200° centrigrade to one end of a combined mixer and conveyor unit, (b) adding an aqueous solution of a phenol-formaldehyde resin in which the molar ratio of phenol to formaldehyde is within the range of from 0.6 to 0.8 to 1 in a continuous stream to said combined mixer and conveyor unit.

(c) adding a solid phenol-formaldehyde resin in which the molar ratio of phenol to formaldehyde is within the range of from 0.75 to 0.85 to 1 as a continuous stream to said combined mixer and conveyor unit, (d) mixing and simultaneously conveying the sand and resins for a predetermined time so as to coat the sand with the resins, (e) adding a curing agent for the resins in a substantially continuous stream, (f) mixing and conveying the resin-coated sand and curing agent and simultaneously cooling said resin-coated sand and curing agent, (g) discharging the coated sand from the unit as a continuous stream, (h) cooling said resin-coated sand, and (i) passing the cooled resin-coated sand to a bagging station.

References Cited
UNITED STATES PATENTS

| | | | |
|---|---|---|---|
| 2,201,321 | 5/1940 | Robie | 117—100 X |
| 2,706,163 | 4/1955 | Fitko | 117—100 X |
| 2,806,832 | 9/1957 | Drumm et al. | 117—100 X |
| 2,888,418 | 5/1959 | Albanese et al. | 117—100 X |
| 2,912,406 | 11/1959 | Less et al. | 117—100 X |
| 2,955,336 | 10/1960 | Horn et al. | 117—100 X |
| 2,991,267 | 7/1961 | Bean | 117—100 X |
| 3,130,070 | 4/1964 | Potters et al. | 117—100 X |
| 3,151,027 | 9/1964 | Cooley et al. | 117—100 X |
| 3,260,617 | 7/1966 | Lawther | 117—100 X |

WILLIAM D. MARTIN, *Primary Examiner.*

EDWARD J. CABIC, *Assistant Examiner.*